(12) United States Patent
Akimoto et al.

(10) Patent No.: US 11,645,025 B2
(45) Date of Patent: May 9, 2023

(54) IMAGE PROCESSING APPARATUS, THAT DISPLAYS CONTENT IN AN ALTERNATIVE ITEM WHEN A HIGHEST PRIORITY ITEM HAS NO CONTENT, DISPLAY CONTROL METHOD, AND COMPUTER-READABLE STORAGE MEDIUM FOR STORING PROGRAM

(71) Applicant: Canon Kabushiki Kaisha, Tokyo (JP)

(72) Inventors: Haruma Akimoto, Kanagawa (JP); Yuki Futatsumori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/555,730

(22) Filed: Dec. 20, 2021

(65) Prior Publication Data

US 2022/0206729 A1 Jun. 30, 2022

(30) Foreign Application Priority Data

Dec. 25, 2020 (JP) .............................. JP2020-217369

(51) Int. Cl.
*G06F 3/12* (2006.01)
(52) U.S. Cl.
CPC .......... *G06F 3/1273* (2013.01); *G06F 3/1207* (2013.01); *G06F 3/1284* (2013.01)

(58) Field of Classification Search
CPC .... G06F 3/1273; G06F 3/1207; G06F 3/1284; H04N 1/0035
See application file for complete search history.

(56) References Cited

U.S. PATENT DOCUMENTS

| | | | |
|---|---|---|---|
| 2009/0195820 A1* | 8/2009 | Sugimoto .......... | H04N 1/00411 358/1.15 |
| 2010/0315674 A1* | 12/2010 | Shimizu ............. | H04N 1/00482 358/1.15 |
| 2021/0203798 A1* | 7/2021 | Ito ...................... | H04N 1/00411 |

FOREIGN PATENT DOCUMENTS

| | | |
|---|---|---|
| JP | 5341489 B2 | 11/2013 |
| JP | 6743091 B2 | 8/2020 |

* cited by examiner

*Primary Examiner* — Juan M Guillermety
(74) *Attorney, Agent, or Firm* — Venable LLP

(57) ABSTRACT

An image processing apparatus comprising a display control unit configured to, in a case where there is an item in which a content has not been set in a plurality of items of job information, decide for each history data of a plurality of jobs an item to be used for displaying a list of execution histories of the plurality of jobs and, based on a content set for the decided item, control the display unit so as to display the list of execution histories of the plurality of jobs.

14 Claims, 11 Drawing Sheets

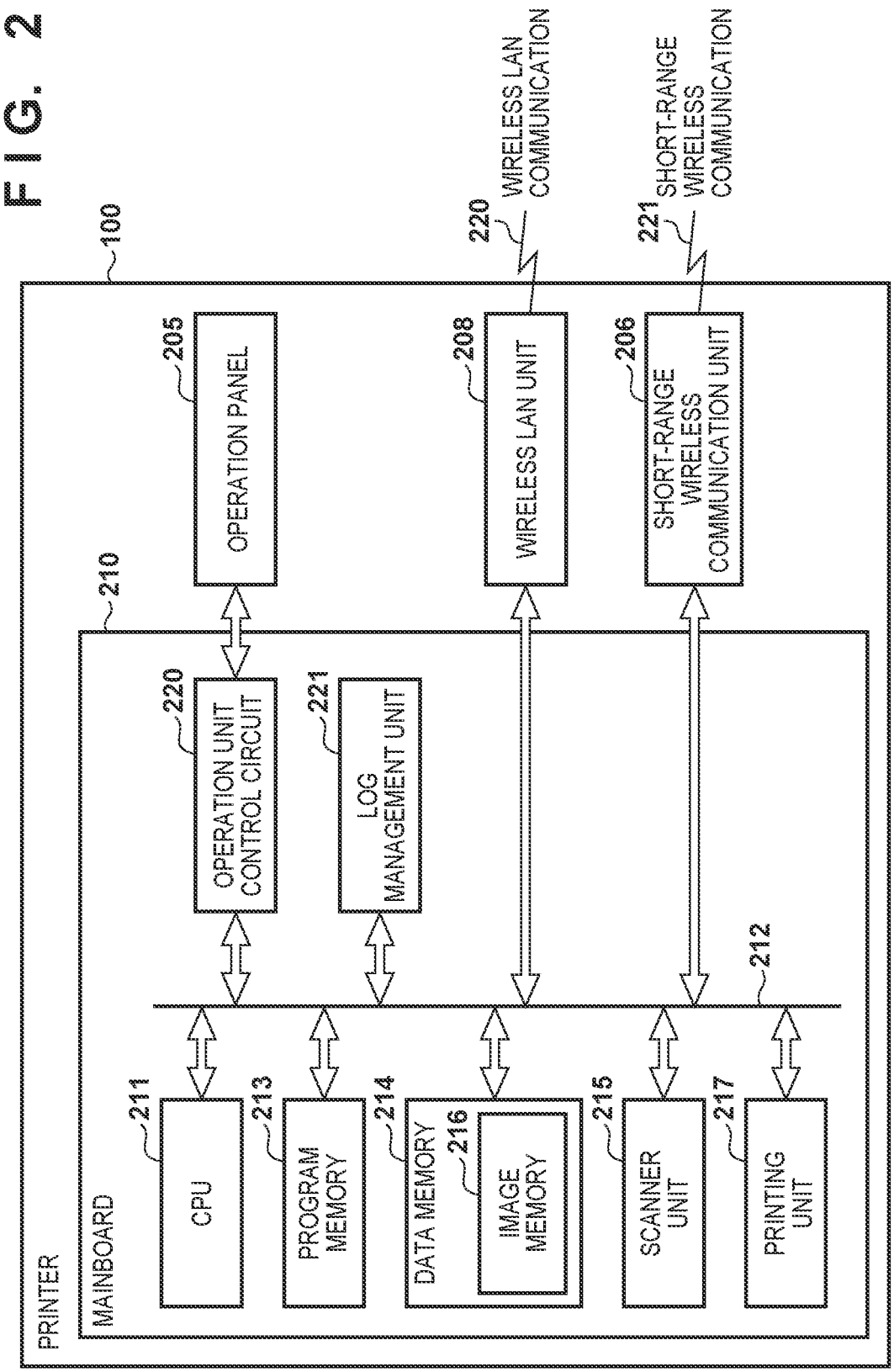

IMAGE PROCESSING APPARATUS, THAT DISPLAYS CONTENT IN AN ALTERNATIVE ITEM WHEN A HIGHEST PRIORITY ITEM HAS NO CONTENT, DISPLAY CONTROL METHOD, AND COMPUTER-READABLE STORAGE MEDIUM FOR STORING PROGRAM

BACKGROUND OF THE INVENTION

Field of the Invention

The present invention relates to an image processing apparatus for executing a job, a display control method, and a computer-readable storage medium for storing a program.

Description of the Related Art

It is known that a function of displaying a list of job histories is provided in image processing apparatuses such as printing apparatuses for w % ben a user browses job histories on a main body panel. Japanese Patent No. 5341489 describes having a user select which of a plurality of existing items to use to display a list when there are a plurality of types of history items. In addition, Japanese Patent No. 6743091 describes that the history items are changed based on the size of the screen on the main body panel.

SUMMARY OF THE INVENTION

The present invention provides an image processing apparatus, a display control method, and a computer-readable storage medium for storing a program for making a job history search easy even if the value of an item has not been set.

The present invention in one aspect provides an image processing apparatus comprising: a storage unit configured to, after a job has been executed, store history data including job information; and a display control unit configured to, based on a content set in an item of the job information included in each history data of a plurality of jobs stored in the storage unit, control a display unit so as to display a list of execution histories of the plurality of jobs, wherein the display control unit, in a case where there is an item in which a content has not been set in the plurality of items of the job information, decide for each history data of the plurality of jobs an item to be used for displaying the list of execution histories of the plurality of jobs and, based on a content set for the decided item, control the display unit so as to display the list of execution histories of the plurality of jobs.

According to the present invention, a job history search can be made easy even if the value of an item has not been set.

Further features of the present invention will become apparent from the following description of exemplary embodiments with reference to the attached drawings.

BRIEF DESCRIPTION OF THE DRAWINGS

FIG. 2 is a diagram illustrating a block configuration of the printing apparatus.

DESCRIPTION OF THE EMBODIMENTS

Figure 1A:
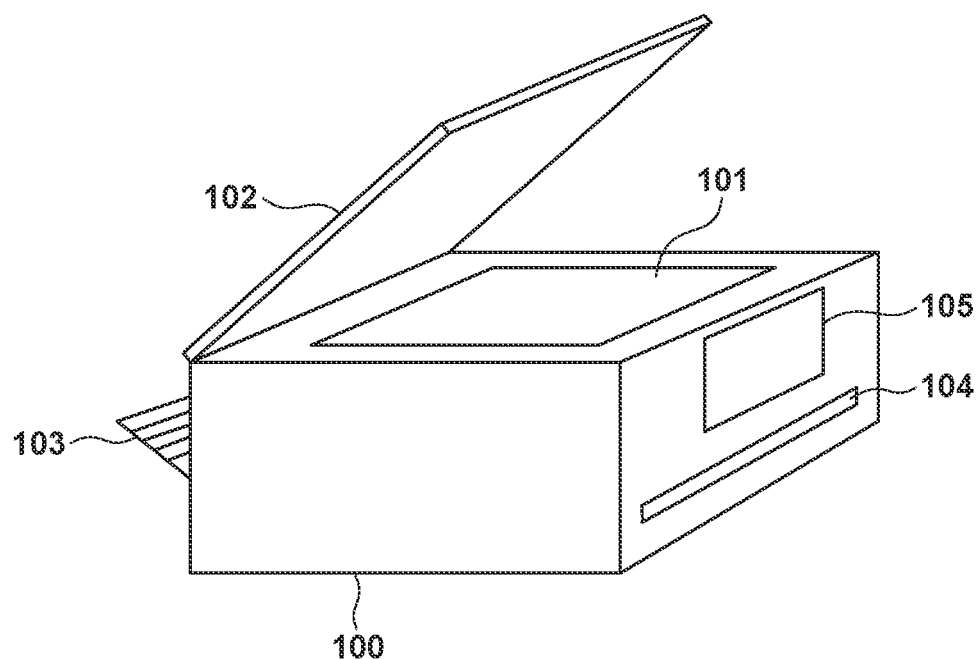
FIGS. 1A and 1B are perspective views of a printing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

If the value of an item to be recorded is not set when recording a job history, a message that there is no recorded item will be displayed in the list of job histories. However, when the number of displays of a message that there is no recorded item is large, the user cannot easily search for the desired job history from the display of the list of job histories.

According to one aspect of the present disclosure, a job history search can be facilitated even if the value of an item has not been set.

First Embodiment

FIG. 1A is a perspective view of a printing apparatus 100 according to the present embodiment. The printing apparatus 100 is an example of an image processing apparatus for processing image data, and a so-called inkjet printer for printing an image by ejecting ink droplets and forming dots on a printing medium, for example, is used as the printing apparatus 100. When plain paper or special paper (glossy paper, postcard, etc.) is set in a paper supply unit 103, the paper is fed to a printing portion. The fed plain paper or special paper (collectively referred to as printing paper) is conveyed, at the time of printing, by a predetermined amount in the direction (conveying direction) of a paper discharge unit 104. Further, an inkjet printhead filled with ink ejects ink droplets while moving back and forth in a direction (scanning direction) perpendicular to the conveying direction. By repeating these processes, printing is performed on the printing paper surfaces. Note that the printing apparatus 100 may be a printing apparatus employing another method such as an electrophotographic method in addition to the inkjet printing method.

The printing apparatus 100 may be configured as a multifunction printer (MFP: MultiFunctional Peripheral) having other functions such as a copy/scan function in addition to the above-described printing function. When executing the copy/scan function, the user opens a document reading table cover 102, places a document on a document reading table 101, and instructs the execution of copy/scan from an operation panel 105 or a remote client (not illustrated). Note that the remote client is, for example, a portable terminal such as a smart phone held by a user.

Figure 1B:
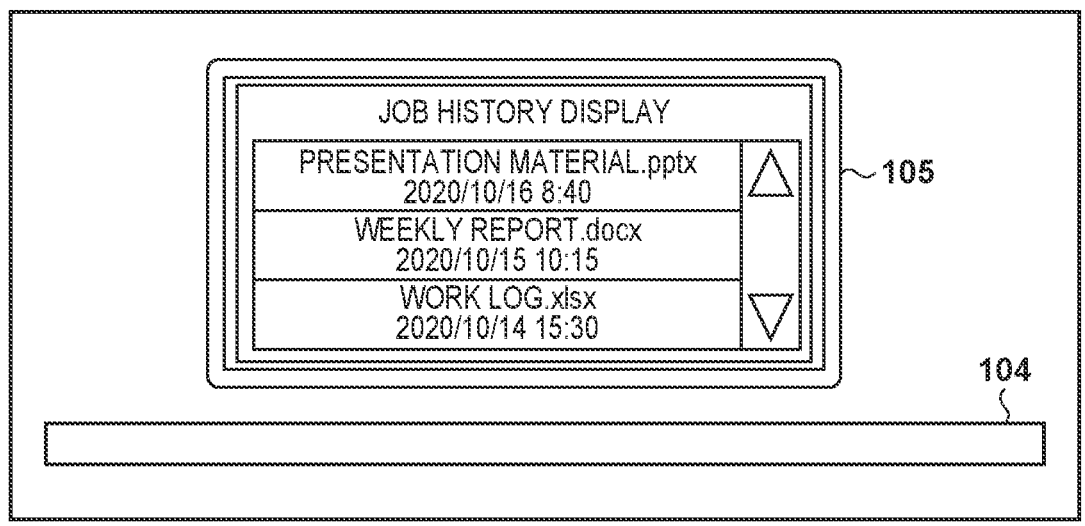

FIG. 1B is a diagram illustrating the operation panel 105 of the printing apparatus 100. The operation panel 105 illustrates an example of a touch-panel-type display unit that can be operated by touch operations of the user but may be a display unit configured such that the operation of a hard key or the like is possible. In the case of the touch-panel-type display unit, screen elements capable of accepting user operations such as instructions and settings are displayed on the operation panel 105, and the printing apparatus 100 operates in accordance with the accepted user operations.

FIG. 2 is a diagram illustrating a block configuration of the printing apparatus 100. The printing apparatus 100 is configured to include a mainboard 210 that comprehensively controls the printing apparatus 100, an operation panel 205, a wireless LAN unit 208, and a short-range wireless communication unit 206. The operation panel 205 corresponds to the operation panel 105 in FIG. 1. A CPU 211 in the form of a microprocessor configured on the mainboard 210 controls each block in the mainboard 210 via an internal bus 212. A program memory 213 stores a control program executed by the CPU 211, a data table, an embedded operating system (OS) program, and the like. A data memory 214 stores program control variables and the like and includes an image memory 216 which holds image data. The operation of the printing apparatus 100 according to the present embodiment is realized, for example, by the CPU 211 reading out a program stored in the program memory 213 to the data memory 214 and then executing the program.

The CPU 211 executes a scanning function of optically reading a document placed on the document reading table 101 by controlling a scanner unit 215. The document reading result is stored in the image memory 216 as image data. Further, the CPU 211 executes a printing function of printing on printing paper based on the image data of the image memory 216 by controlling a printing unit 217.

The CPU 211 can perform wireless LAN communication 220 with other apparatuses via the wireless LAN unit 208. The wireless LAN unit 208 may also operate as an access point configured as software or hardware. In addition, the CPU 211 can also perform short-range wireless communication 221 with other apparatuses having a short-range wireless communication unit via the short-range wireless communication unit 206. The printing apparatus 100 receives image data and jobs from, for example, an external PC, a portable terminal, a server, or the like via the wireless LAN unit 208 or the short-range wireless communication unit 206.

A log management unit 221 stores a record of operations executed in the past as a log. For example, the log management unit 221 stores, as a log, a record of operations processed by the printing unit 217 due to executing the printing function.

The CPU 211 controls the operation panel 205 to display various user interface screens such as a display of the state of the printing apparatus 100 and a display of a function selection menu via an operation unit control circuit 220. Further, the CPU 211 can receive information corresponding to user operations accepted via the operation panel 205. The operation panel 205 is provided with a backlight, and the CPU 211 can control to turn the backlight on and off via the operation unit control circuit 220. For example, when a power saving mode of the printing apparatus 100 is executed, the CPU 211 controls to turn the backlight off.

Figure 3:
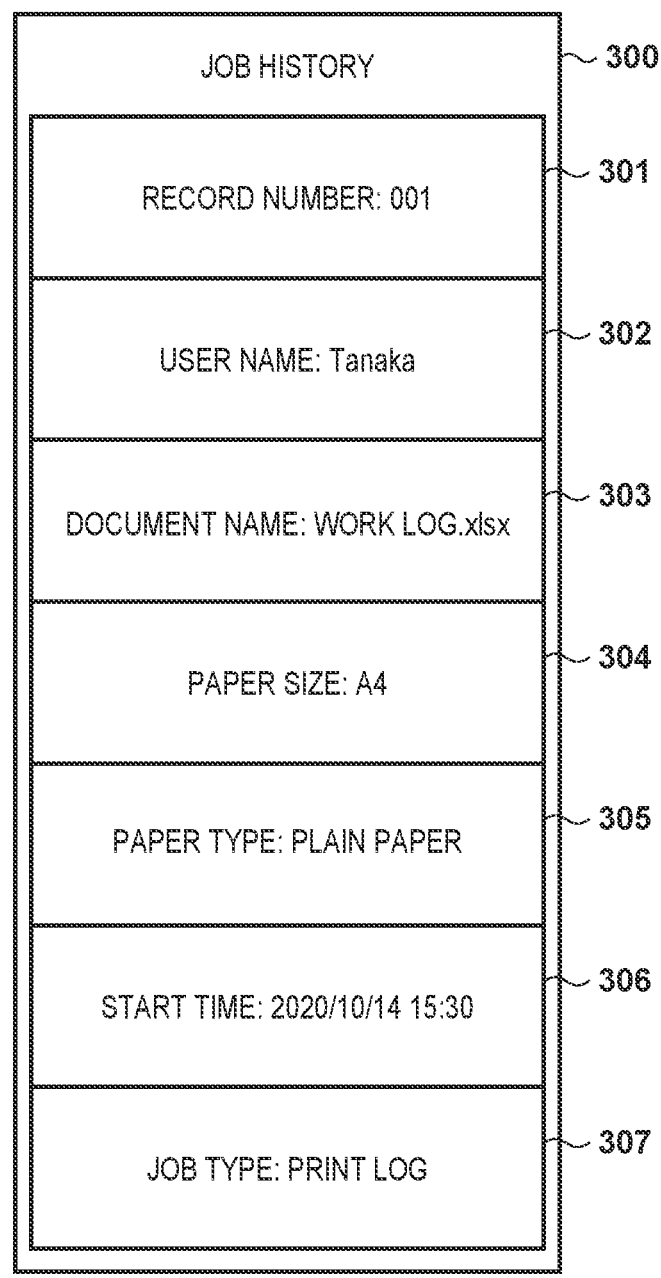
FIG. 3 is a diagram illustrating job history data.

FIG. 3 is a diagram illustrating an example of job history data. As illustrated in FIG. 3, job history data 300 includes a plurality of items 301 to 307 as job information. In the present embodiment, the job history data 300 including the items 301 to 307 is generated as a log for one operation of the printing apparatus 100 to be recorded by the log. The item 301 is a "record number", is identification information uniquely assigned to the job history data 300 generated by one operation of the printing apparatus 100, and is assigned so as to be counted up from 1 in the order of operations of the printing apparatus 100, for example. The item 302 is a "user name" and is a character string uniquely defined in a function of managing the users of the printing apparatus 100 for the user who instructed the one operation of the printing apparatus 100. The item 303 is a "document name"; the string specified in the job, for example, is set; if no string is specified, an empty string is set.

The item 304 is a "paper size"; the paper size specified in the job is set, and when a plurality of paper sizes are specified in one job, the paper size of the last page is set. The item 305 is a "paper type", and the paper type specified in the job is set. If a plurality of paper types are specified in one job, the paper type of the last page is set. The item 306 is a "start time" and indicates the time at which the job was started. The "start time" of the item 306 is set when, for example, an instruction to execute the job in the printing apparatus 100 is accepted from the user. The item 307 is a "job type", and a fixed value corresponding to the job type is set. In the present embodiment, a fixed value corresponding to any one of three types of print log, copy log, and communication log, for example, is set.

Figure 4:
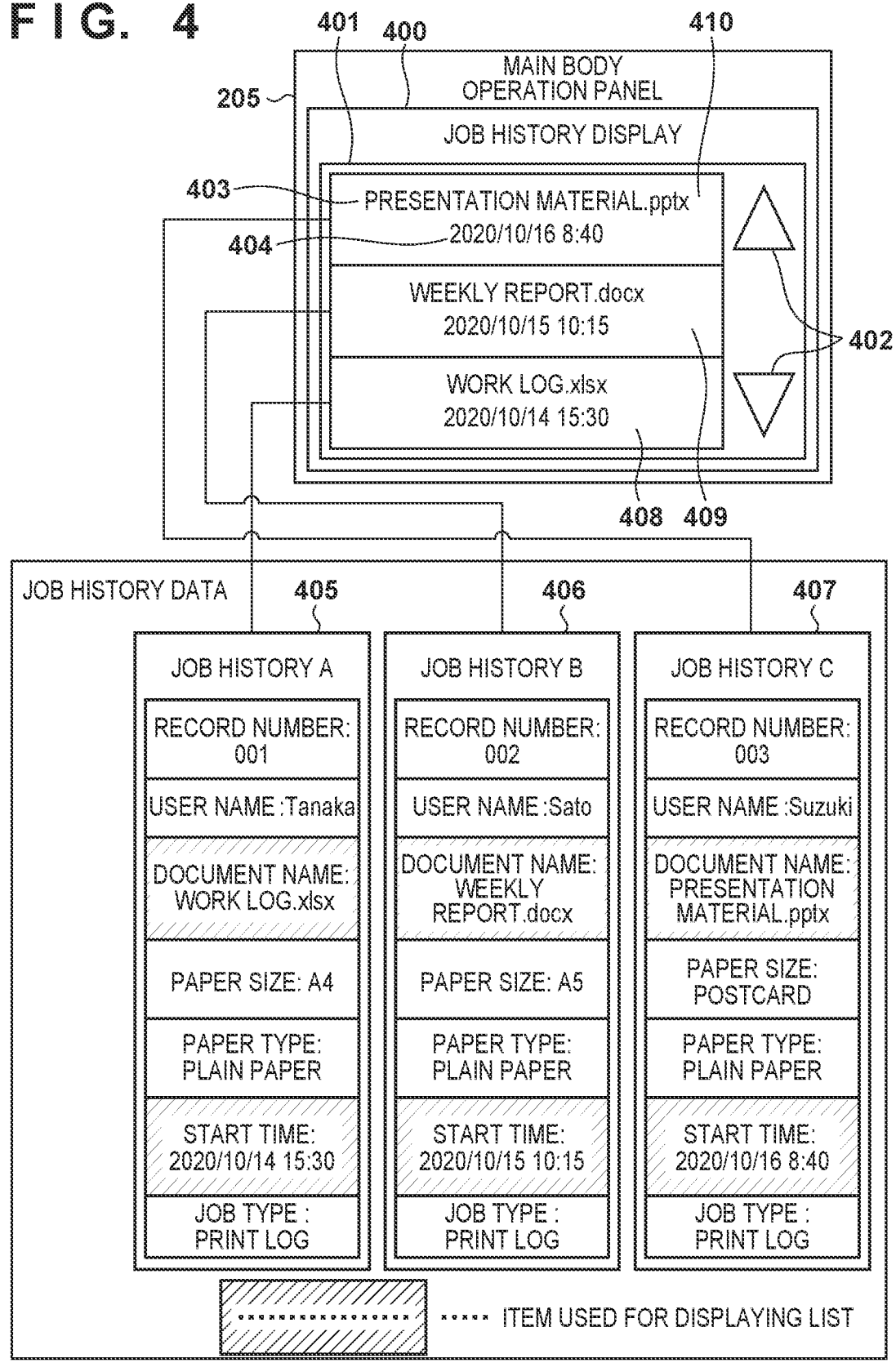
FIG. 4 is a diagram for explaining a display of a job history list.

FIG. 4 is a diagram for explaining a display of a job history list. FIG. 4 illustrates the correspondence between a format of a display on the operation panel 205 and the job history data 300 in FIG. 3. As illustrated in FIG. 4, a display screen 400 is displayed on the operation panel 205. "Job history display" is displayed at the uppermost portion of the display screen 400. A job history list 401 is displayed on the display screen 400, and it is possible to display a job execution history of previously-performed operations by scrolling up and down by user operations of up and down keys 402 on the touch panel.

In the present embodiment, the display of each job history of the job history list 401 is such that the display of each job history can be identified as one job history including a first-line display item 403 and a second-line display item 404. In addition, as illustrated in FIG. 4, a plurality of job histories are arranged in the vertical direction of the screen, and a function of enabling the user to search for a job history by a scroll function of the up and down keys 402 is provided. Further, the user can select a desired log type in advance from the print log, the copy log, and the communication log on the menu screen (not illustrated), and the job history list 401 corresponding to the selected log type is displayed. Therefore, in the job history list 401, the "job type" of the item 307 is a fixed value corresponding to one job type.

Job history data corresponding to each job history is illustrated in the lower part of FIG. 4. FIG. 4 illustrates job history data 405 corresponding to a job history A, job history data 406 corresponding to a job history B. and job history data 407 corresponding to a job history C. The job history data 405 corresponds to a job history 408 of the job history list 401, the job history data 406 corresponds to a job history 409 of the job history list 401, and the job history data 407 corresponds to a job history 410 of the job history list 401.

In the present embodiment, the job history 408 to 410 display the setting contents of the "document name" of the item 303 as the display item 403 and display the setting contents of the "start time" of the item 306 as the display item 404. In the job history data 405 to 407 of FIG. 4, hatched portions indicate items used in the job history display. For example, the job history data 405 indicates that the setting content of the "document name" in the item 303 and the setting content of the "start time" in the item 306 are used for displaying the job history.

In the present embodiment, when the job history list is displayed, if the content has not been set in a predetermined item to be displayed in the job history list, a fixed character string corresponding to the job type is displayed instead.

Figure 5:
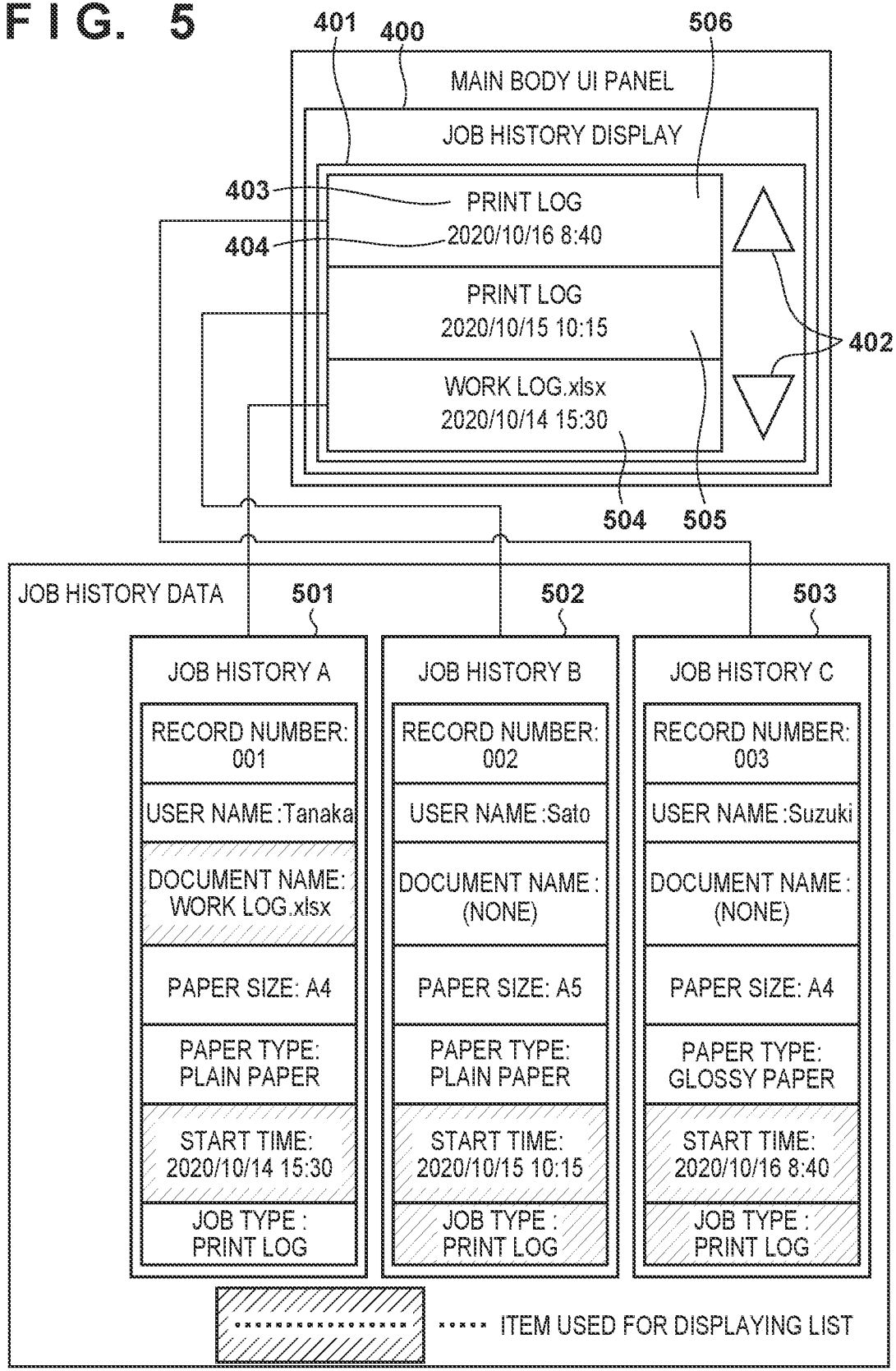
FIG. 5 is a diagram illustrating a case where "document name" was not set.

FIG. 5 is a diagram illustrating a case where the "document name" of the item 303 to be used for displaying the job history list is blank (not set) in the job history B and the job history C. In job history data 501 of the job history A, both "document name" of the item 303 and "start time" of the item 306 are set. Therefore, the setting content "WORK LOG. xlsx" of the "document name" is displayed in the first-line display item 403 of a job history 504, and the setting content "2020/10/14 15:30" of the "start time" is displayed in the second-line display item 404.

In job history data 502 of the job history B, the "document name" of the item 303 has not been set. Therefore, in the present embodiment, instead of the "document name" of the item 303, the setting content of the "job type" of the item 307 is displayed. That is, the setting content "print log" of the "job type" is displayed in the first-line display item 403 of a job history 505.

In job history data 503 of the job history C, the "document name" of the item 303 has not been set. Therefore, in the present embodiment, instead of the "document name" of the item 303, the setting content of the "job type" of the item 307 is displayed. That is, the setting content "print log" of the "job type" is displayed in the first-line display item 403 of a job history 506.

For example, when displaying a list of print logs, the value of "job type" is fixed to "print log". Therefore, in the present embodiment, the item "job type" is used as an alternative display item.

Figure 6:
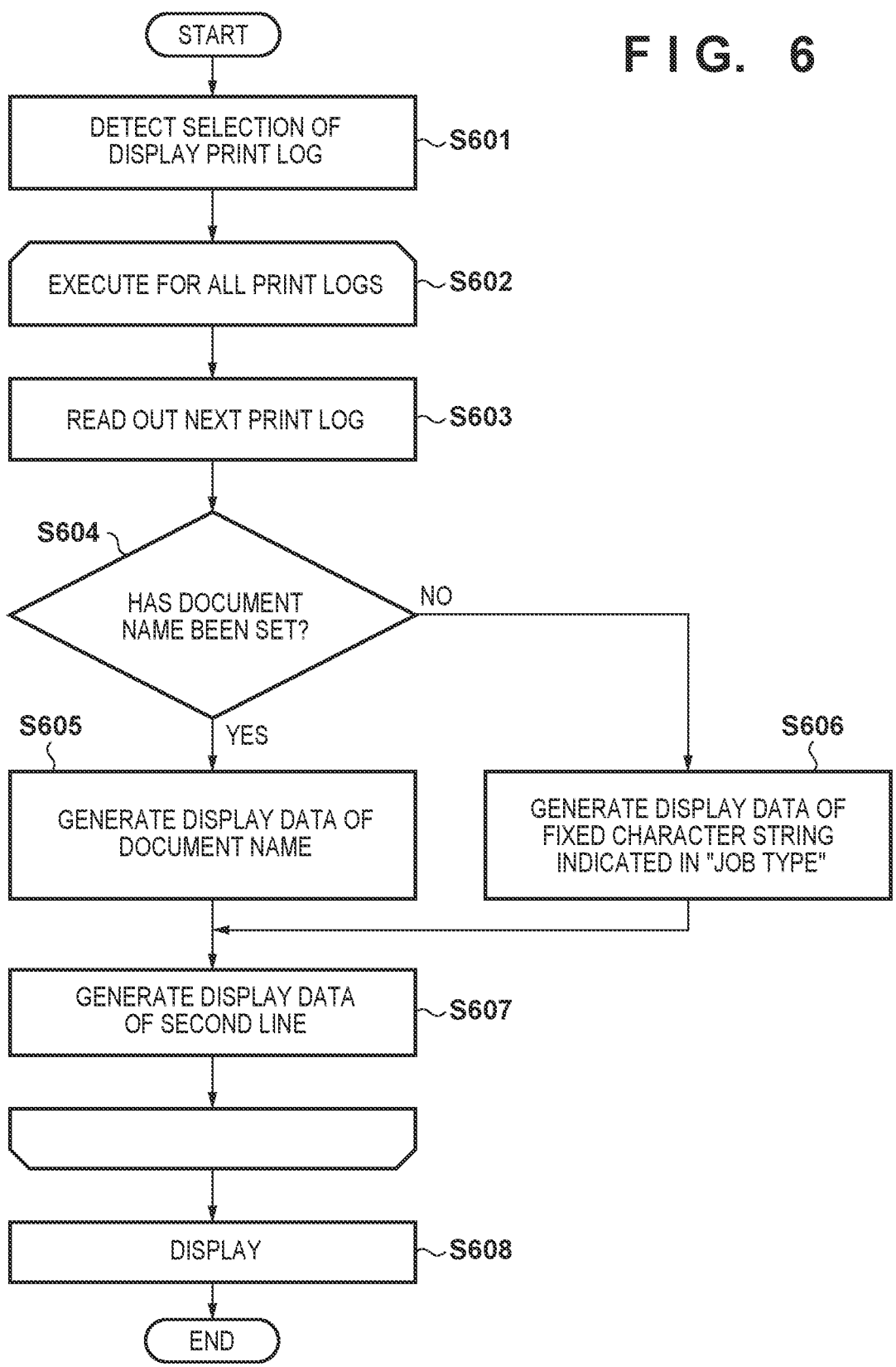
FIG. 6 is a flowchart illustrating a process of controlling a display of a job history list.

FIG. 6 is a flowchart illustrating a process of controlling a display of a job history list. The process of FIG. 6 is realized, for example, by the CPU 211 reading out a program stored in the program memory 213 to the data memory 214 and then executing the program. Further, the process of FIG. 6 is started, for example, when an instruction to display a job history list has been accepted on a menu screen displayed on the operation panel 205.

In step S601, the CPU 211 accepts from the user the selection of print log as the log type for when displaying the job history list on the operation panel 205. When the selection of print log is accepted, the process from step S602 and thereafter is repeated for all the print logs stored in the log management unit 221. Here, description will be given with print log as an example; however, the same process as described below will be performed even when another log type is selected.

In step S603, the CPU 211 reads one print log stored in the log management unit 221. In step S604, the CPU 211 determines whether or not the content has been set in the "document name" in the item 303 in the job history data of the read print log. When it is determined that the content has been set, in step S605 the CPU 211 generates the display data of the first-line display item 403 of the job history based on the setting content of the "document name" in the item 303. On the other hand, when it is determined that the content has not been set, in step S606 the CPU 211 generates the display data of the second-line display item 404 of the job history based on the setting content "print log" of the "job type" in the item 307. After step S605 or S606, in step S607 the CPU 211 generates the display data of the second-line display item 404 of the job history based on the setting content of the "start time" in the item 306.

After step S607, the CPU 211 reads the next print log stored in the log management unit 221 and repeats the process from step S603. When the process from steps S603 to S607 has been performed on all the print logs stored in the log management unit 221, in step S608 the CPU 211 displays the job history list on the operation panel 205 based on the generated display data. After step S608, the process of FIG. 6 ends.

As described above, according to the present embodiment, when the user searches for the past log from the job history list, the log in which the contents are set for the predetermined items will be displayed based on the contents. Further, for a log in which the contents have not been set for a predetermined item, an item representing an attribute common to each job history will be decided as an alternative display item of the predetermined item, and the setting content thereof will be displayed. For example, in the case where the user has forgotten to set the document name, in the job history, an item of the job type is decided as an alternative display item and a character string "print log" indicating the log type is displayed together with the start time. In this case, the character string indicating the log type may be defined as the number of characters less than or equal to the threshold value with respect to the maximum number of characters that can be displayed in the horizontal width of the job history. With such a configuration, it is possible to prevent the complication that the number of characters is long and spans two lines such as "The document name has not been entered", for example, and to improve displayability.

Further, according to the present embodiment, when "print log" is displayed, it is displayed together with an item whose content is always set such as a start time. With such a configuration, the user can easily find a desired log using the start time as a key.

Further, in the present embodiment, the "job type" is described as an alternative item of the document name, but other items may be used. For example, as long as the item represents an attribute common to each job history displayed in the job history list 401, the item may be decided as an alternative item.

Second Embodiment

Hereinafter, a second embodiment will be described with reference to points different from the first embodiment. In the first embodiment, a configuration has been described in which a job type item is decided as an alternative display item and a fixed character string corresponding to a log type is displayed. In the present embodiment, the display item in which the content is set regardless of whether the item represents an attribute common to each job history is decided as an alternative item.

Figure 7:
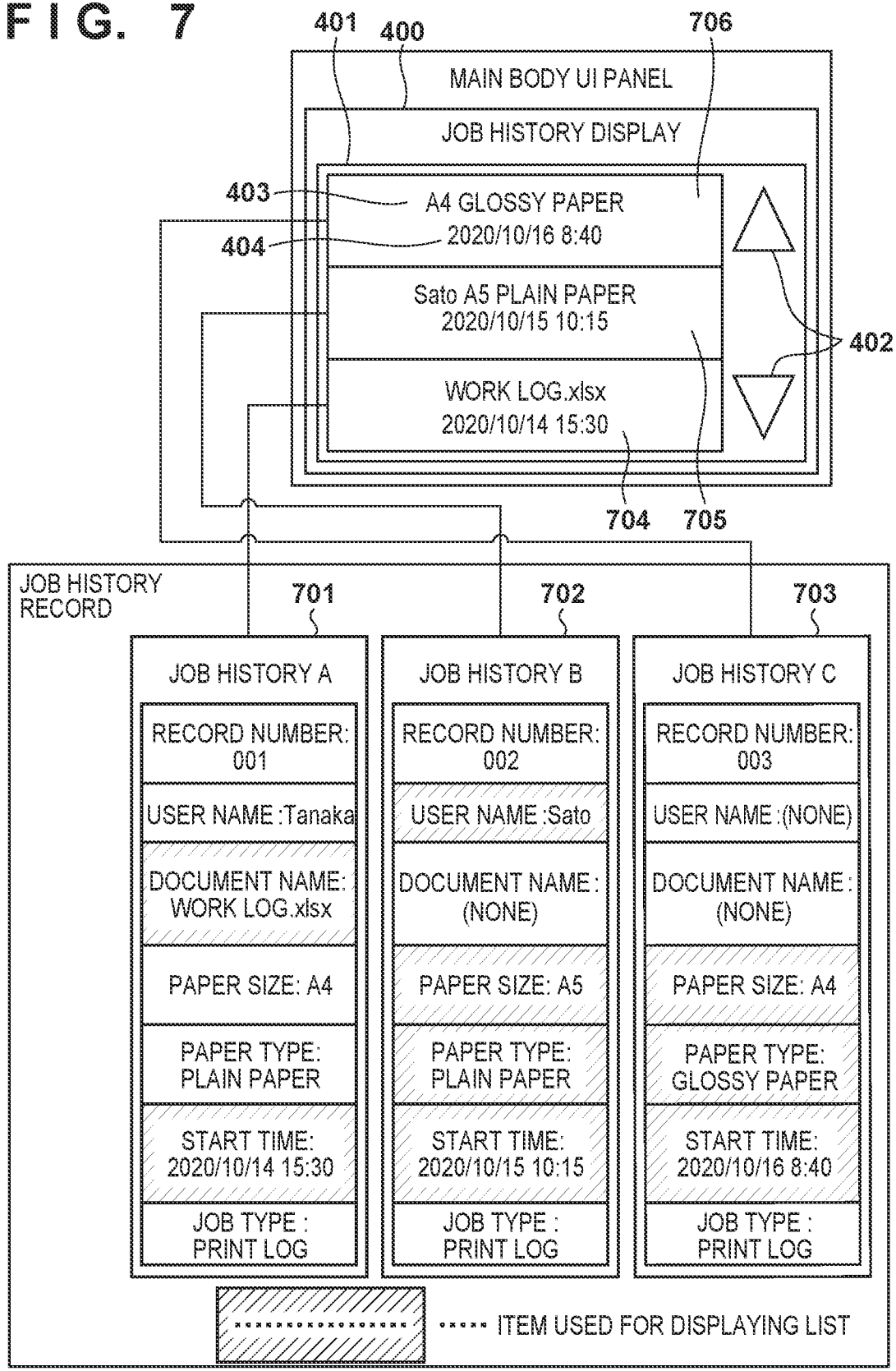
FIG. 7 is a diagram illustrating a case where "document name" was not set.

FIG. 7 is a diagram illustrating a case in the present embodiment where the "document name" of the item 303 to be used for displaying the job history list is blank (not set) in the job history B and the job history C. In job history data 701 of the job history A, both "document name" of the item 303 and "start time" of the item 306 are set. Therefore, the setting content "WORK LOG. xlsx" of the "document name" is displayed in the first-line display item 403 of a job history 704, and the setting content "2020/10/14 15:30" of the "start time" is displayed in the second-line display item 404.

In job history data 702 of the job history B, the "document name" of the item 303 has not been set. Therefore, in the present embodiment, instead of the "document name" of the item 303, the setting contents of the "user name" of the item 302, the "paper size" of the item 304, and the "paper type" of the item 305 for which the contents have been set are displayed. That is, the setting content "Sato" of the "user name", the setting content "A5" of the "paper size", and the setting content "plain paper" of the "paper type" are displayed in the first-line display item 403 of a job history 705.

In job history data 703 of the job history C, the "document name" of the item 303 has not been set. Therefore, in the present embodiment, instead of the "document name" of the item 303, the setting contents of the "paper size" of the item 304 and the "paper type" of the item 305 for which the contents have been set are displayed. That is, the setting content "A4" of the "paper size" and the setting content "glossy paper" of the "paper type" are displayed in the first-line display item 403 of a job history 706. Here, the "user name" of the item 302 is not displayed because the "user name" of the item 302 has not been set in the job history data 703.

As described above, in the present embodiment, w % ben the content has not been set for a predetermined item such as the "document name", the job history is displayed using the contents of the other items in which the content has been set. For example, as illustrated in FIG. 7, "Sato A5 plain paper" is displayed in the job history 705, and "A4 glossy paper" is displayed in the job history 706. As described above, since the contents of the items for which the contents have been set are displayed, even if the user forgets to set the document name, for example, the user can easily find the desired log.

Figure 8:
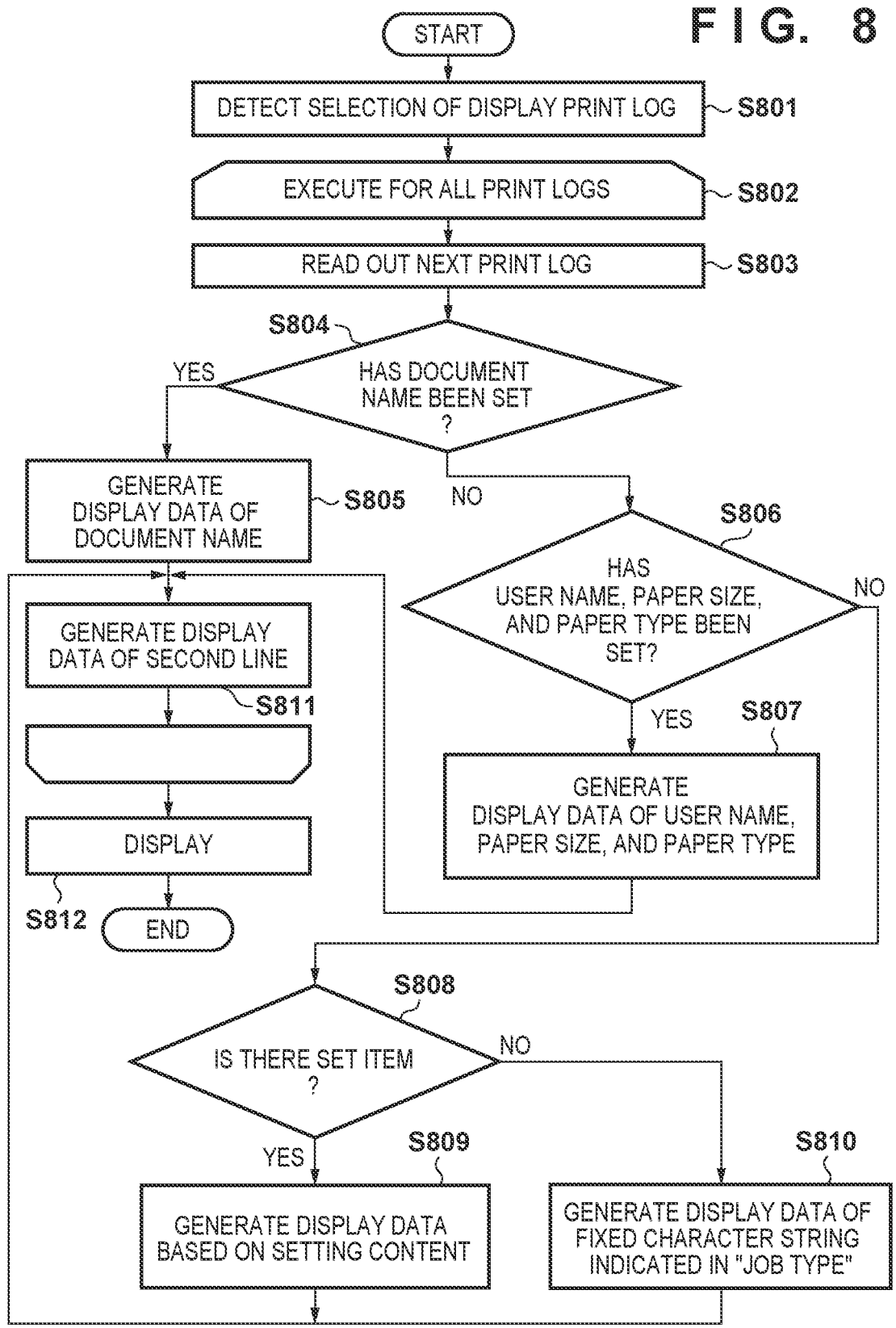
FIG. 8 is a flowchart illustrating a process of controlling a display of a job history list.

FIG. 8 is a flowchart illustrating a process of controlling a display of a job history list in the present embodiment. The process of FIG. 8 is realized, for example, by the CPU 211 reading out a program stored in the program memory 213 to the data memory 214 and then executing the program. Further, the process of FIG. 8 is started, for example, when an instruction to display a job history list has been accepted on a menu screen displayed on the operation panel 205.

In step S801, the CPU 211 accepts from the user the selection of print log as the log type for when displaying the job history list on the operation panel 205. When the selection of print log is accepted, the process from step S802 and thereafter is repeated for all the print logs stored in the log management unit 221. Here, description will be given with print log as an example; however, the same process as described below will be performed even when another log type is selected.

In step S803, the CPU 211 reads one print log stored in the log management unit 221. In step S804, the CPU 211 determines whether or not the content has been set in the "document name" in the item 303 in the job history data of the read print log. When it is determined that the content has been set, in step S805, the CPU 211 generates the display data of the first-line display item 403 of the job history based on the setting content of the "document name" in the item 303. On the other hand, when it is determined that the content has not been set, in step S806 the CPU 211 determines whether or not the content has been set for all of the "user name" of the item 302, "paper size" of the item 304, and "paper type" of the item 305 in the job history data of the read print log. When it is determined that the content has been set for all the items, in step S807 the CPU 211 generates the display data of the first-line display item 403 of the job history based on each of the setting contents of the "user name" in the item 302, the "paper size" in the item 304, and the "paper type" in the item 305. This corresponds to, for example, the display of the job history 705 in FIG. 7.

That is, in step S804, it is first determined whether or not the content has been set in a predetermined item, and if the content has been set for the predetermined item, the item is displayed. If the content has not been set for the predetermined item, it is determined whether the content has been set for all of the other items. Other items here are items for which the content can be set by the user, for example. The start time of the item 306, the job type of the item 307, and the like are contents that cannot be changed by the user and therefore do not correspond to the above "other items".

When it is in step S806 determined that the content has not been set for all of the other items, in step S808 the CPU 211 determines whether the content has been set for at least one of or none of the "user name" of the item 302, "paper size" of the item 304, and "paper type" of the item 305 in the job history data of the read print log. When it is determined that at least one of the contents has been set, in step S809 the CPU 211 generates the display data of the first-line display item 403 of the job history based on the setting content of the item for which the content has been set. This corresponds to, for example, the display of the job history 706 in FIG. 7. In this manner, by the process of step S808, the display can be performed based on at least the content set by the user, for example.

When it is determined in step S808 that the content has not been set for any of the items, in step S810 the CPU 211 generates the display data of the second-line display item 404 of the job history based on the setting content "print log" of the "job type" in the item 307. After step S805, S807, S809, or S810, in step S811 the CPU 211 generates the display data of the second-line display item 404 of the job history based on the setting content of the "start time" in the item 306.

After step S811, the CPU 211 reads the next print log stored in the log management unit 221 and repeats the process from step S803. When the process from steps S803 to S810 has been performed on all the print logs stored in the log management unit 221, in step S812 the CPU 211 displays the job history list on the operation panel 205 based on the generated display data. After step S812, the process of FIG. 8 ends.

As described above, according to the present embodiment, when the user searches for the past log from the job history list, the log in which the contents are set in the predetermined items will be displayed based on the contents. Further, for a log in which the content has not been set for a predetermined item, other items for which the contents have been set are decided as an alternative display item instead of the predetermined item, and the display is performed based on the setting content. As a result, the user can easily find a desired log.

Third Embodiment

Hereinafter, a third embodiment will be described with reference to points different from the first and second embodiments. In the first embodiment, a configuration has been described in which a job type item is decided as an alternative display item and a fixed character string corresponding to a log type is displayed. In the second embodiment, a configuration has been described in which an item whose content has been set is decided as an alternative display item, and display is performed based on the set content. In the present embodiment, the display items are decided so that the items of each job history to be displayed are unified.

Figure 9:
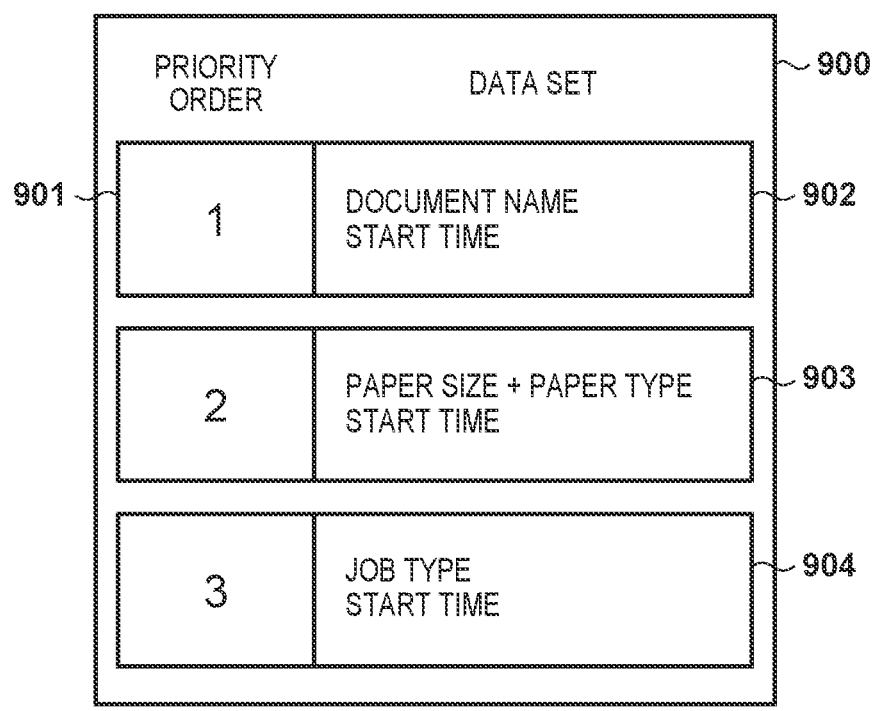
FIG. 9 is a diagram illustrating a table illustrating the priority of items to be displayed.

FIG. 9 is a diagram illustrating an example of a table illustrating a priority order of a data set that defines a priority order of items to be displayed when a job history list is displayed. A table 900 illustrated in FIG. 9 is stored in the data memory 214, for example. A plurality of data sets are set in the table 900, and a priority order 901 is associated with each data set. FIG. 9 illustrates that "1" is the highest priority and that the priority decreases in the order of "2" and "3". The data set specifies the items of the job history data that are to be display items in the job history list. Each data set contains the items to be displayed in the first-line display item 403 of the job history and the items to be displayed in the second-line display item 404. That is, in a data set 902, the "document name" of the item 303 is defined as an item of the job history to be displayed in the display item 403, and the "start time" of the item 306 is defined as an item of the job history to be displayed in the display item 404. In a data set 903, the "paper size" of the item 304 and the "paper type" of the item 305 are defined as items of the job history to be displayed in the display item 403, and the "start time" of the item 306 is defined as an item of the job history to be displayed in the display item 404. In a data set 904, the "job type" of the item 307 is defined as an item of the job history to be displayed in the display item 403, and a "start time" of the item 306 is defined as an item of the job history to be displayed in the display item 404.

Each item of FIG. 9 is an example and there is no limitation to the example of FIG. 9 as long as it is an item included in the job history data. For example, in the data set 903, "paper type" and "single-sided/double-sided" may be defined as the items of the job history to be displayed in the display item 403.

In other words, the priority order of each data set illustrated in the table 900 of FIG. 9 can be said to be determined in the following order. The "document name" in the priority order "1" is very likely to differ depending on the job history data. It can be said that there is a high possibility that the "paper type" in the priority order "2" may differ depending on the job history data, even if it is not as likely as the "document name". The "job type" in the priority order "3" will be a fixed value depending on the job history data if it is a print log. Thus, it can be said that the higher the probability that the attribute may differ depending on the job history data, the higher the priority is set. In addition, the data set is not limited to the example illustrated in FIG. 9 as long as such a priority level condition is satisfied. In FIG. 9, the priority order is illustrated up to "3" but is not limited to such an example, and the priority order "4" and thereafter may be determined.

Figure 10:
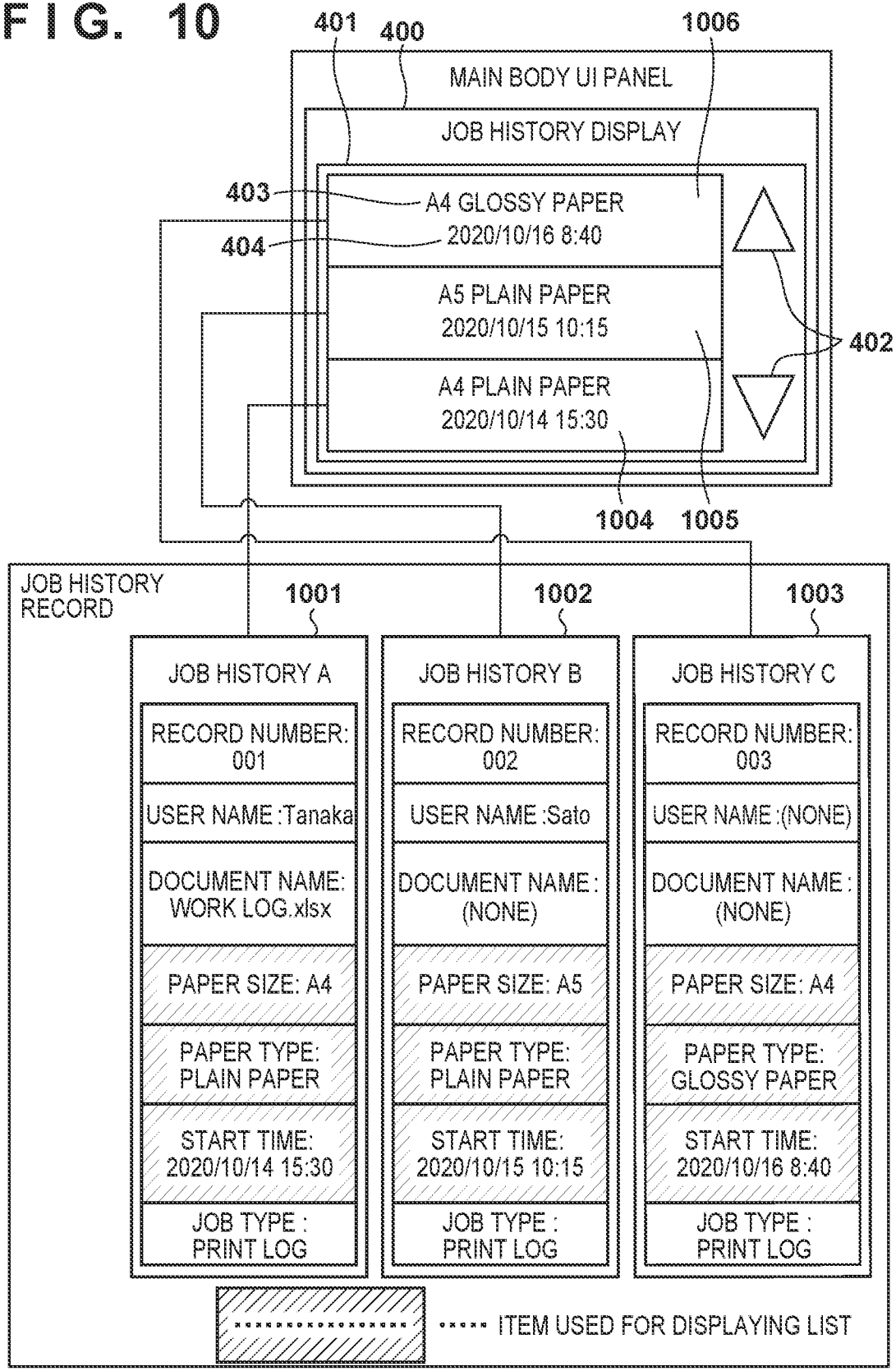
FIG. 10 is a diagram for explaining a display of a job history list.

FIG. 10 is a diagram for explaining a display of a job history list in the present embodiment. In job history data 1001 of the job history A, all of the items 301 to 307 have been set. In job history data 1002 of the job history B, the "document name" of the item 303 has not been set. In job history data 1003 of the job history C, the "user name" of the item 302 and the "document name" of the item 303 have not been set. Meanwhile, the setting contents of "paper size" of the item 304, "paper type" of the item 305, and "start time" of the item 306 are commonly displayed in a job history 1004 corresponding to the job history data 1001, a job history 1005 corresponding to the job history data 1002, and a job history 1006 corresponding to the job history data 1003.

As described above, in the present embodiment, the job history is displayed based on the setting contents of items common in that the contents have been set in each job history data. However, although they are common as an item, the setting contents thereof differ according to the job history data.

Figure 11:
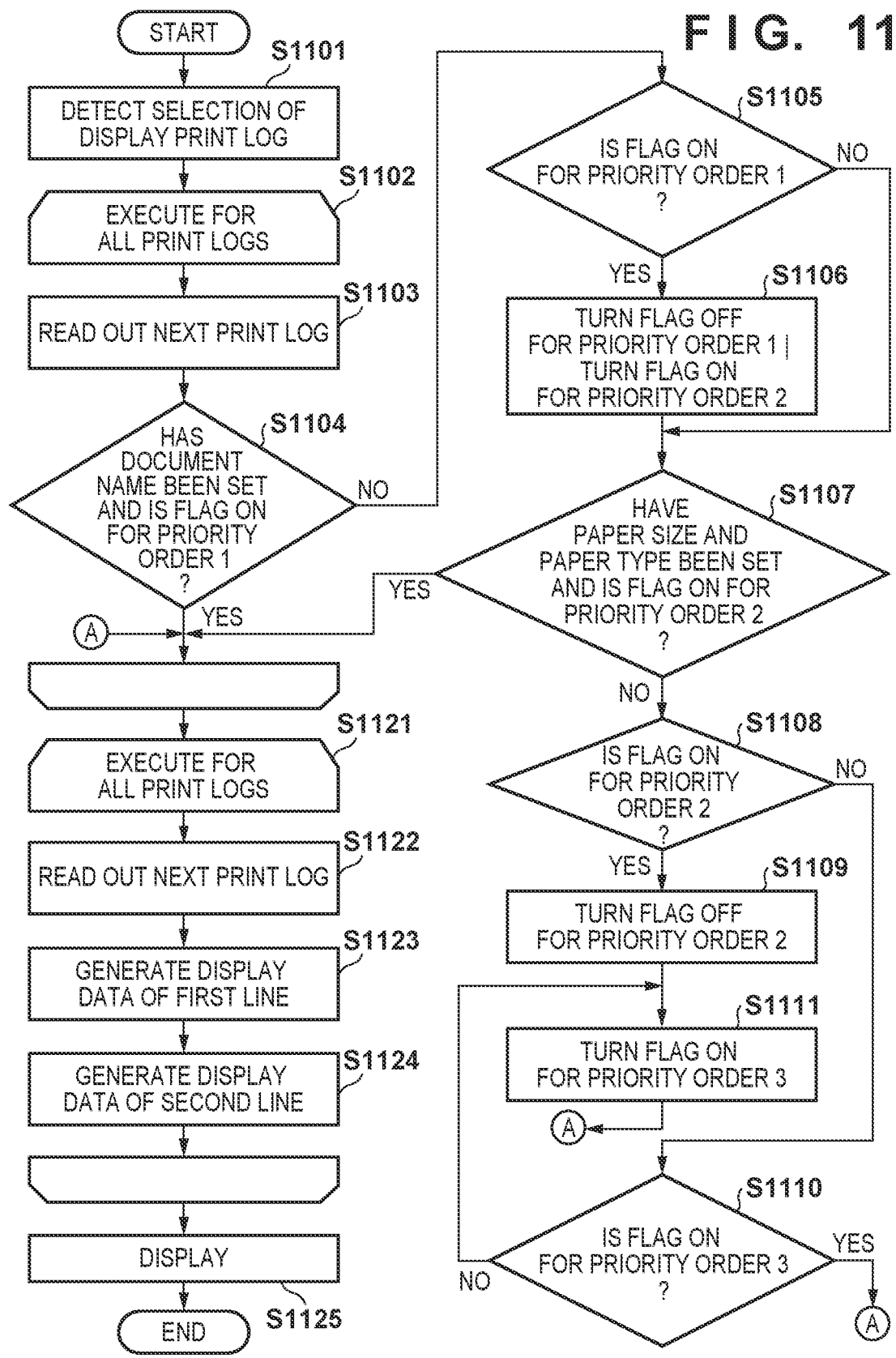
FIG. 11 is a flowchart illustrating a process of controlling a display of a job history list.

FIG. 11 is a flowchart illustrating a process of controlling a display of a job history list in the present embodiment. The process of FIG. 11 is realized, for example, by the CPU 211 reading out a program stored in the program memory 213 to the data memory 214 and then executing the program. Further, the process of FIG. 11 is started, for example, when an instruction to display a job history list has been accepted on a menu screen displayed on the operation panel 205. Further, in the data memory 214, the flag corresponding to each priority order defined in the table 900 of FIG. 9 is stored, and for each flag, enabled (on) or disabled (off) is set. Note that, as an initial value of the flag, the flag of the priority order "1" is on, the flag of the priority order "2" and "3" are set to off. Also, only one of the flags corresponding to each priority order is set to ON.

In step S101, the CPU 211 accepts from the user the selection of print log as the log type for when displaying the job history list on the operation panel 205. When the selection of print log is accepted, the process from step S1102 and thereafter is repeated for all the print logs stored in the log management unit 221. Here, description will be given with print log as an example; however, the same process as described below will be performed even when another log type is selected.

In step S1103, the CPU 211 reads one print log stored in the log management unit 221. In step S1104, the CPU 211 determines whether or not the content has been set in the "document name" in the item 303 in the job history data of the read print log and that a condition that the flag of priority order "1" is on is satisfied. If it is determined that the condition is satisfied, the process returns to step S1103, and the CPU 211 reads the next print log.

On the other hand, if the condition is not satisfied, that is, if the "document name" is blank or the flag of the priority order "1" is off even if the content has been set for the "document name", the process proceeds to step S1105. Here, the flag of the priority order "1" is off even if the content has been set for the "document name" is, for example, when the flag of the priority order "2" and thereafter has been set to on by the present loop process for the job history data of the previously-read print log.

In step S1105, the CPU 211 determines whether or not the flag of the priority order "1" is on. If the flag of the priority order "1" is determined to be on, in step S1106 the CPU 211 sets the flag of the priority order "1" to off, sets the flag of the priority order "2" to on, and proceeds to step S1107. On the other hand, when it is determined that the flag of the priority order "1" is not on, the process proceeds to step S1107.

In step S1107, the CPU 211 determines whether or not the job history data of the read print log satisfies the condition in which the content has been set for the "paper size" of the item 304 and the "paper type" of the item 305 and the flag of the priority order "2" is on. If it is determined that the condition is satisfied, the process returns to step S1103, and the CPU 211 reads the next print log.

On the other hand, if the condition is not satisfied, that is, if the "paper size" and the "paper type" are blank, or if the flag of the priority order "2" is off even if the contents are set to the "paper size" and the "paper type", the process proceeds to step S1108. Here, the flag of the priority order "2" is off even if the content has been set for the "paper size" and "paper type" is, for example, when the flag of the priority order "3" has been set to on by the present loop process for the job history data of the previously-read print log.

In step S1108, the CPU 211 determines whether or not the flag of the priority order "2" is on. If the flag of the priority order "2" is determined to be on, in step S1109 the CPU 211 sets the flag of the priority order "2" to off and proceeds to step S1111. In step S1111, the CPU 211 sets the flag of the priority order "3" to on and returns to step S1103 to read the next print log. On the other hand, if the flag of the priority order "2" is determined not to be on, the process proceeds to step S1110, and the CPU 211 determines whether or not the flag of the priority order "3" is on. If it is determined that the flag of the priority order "3" is on, the process returns to step S1103, and the CPU 211 reads the next print log. On the other hand, if the flag of the priority order "3" is determined not to be on, the process proceeds to step S1111, and the CPU 211 sets the flag of the priority order "3" to on.

As described above, in the present embodiment, the print logs stored in the log management unit 221 are read out in order and determination is performed as to whether the content of an item of interest has been set and the flag of the priority order corresponding to that item is on. If the corresponding priority order flag is on but the content has not been set, the flag of the next highest priority order is turned on. Further, when the corresponding priority order flag is off although the content has been set, determination is performed as to whether the content has been set for the item corresponding to the flag of the next highest priority order and whether the priority order flag corresponding to that item is on. In this way, a search is performed as to which item is common in that it is an item for which the content has been set, and the priority order corresponding to the searched common item is specified. One case is described below.

For example, when the "document name" has been set in the job history data of the first print log read from the log management unit 221, it is determined in step S1104 that the condition is satisfied. Next, when the "document name" has not been set and the "paper size" and "paper type" are set in the job history data of the second read print log, the process proceeds from step S1104 to step S1105, the flag of the priority order "1" is set to off and the flag of the priority order "2" is set to on in step S1106. Then, in step S1107, it is determined that the condition is satisfied.

Next, when the "document name", "paper size" and "paper type" have not been set in the job history data of the third read print log, the process proceeds from steps S1104 and S1105 to step S1107, and it is determined in step S1107 that the condition is not satisfied. Then, the process proceeds from step S1108 to step S1109, the flag in priority order "2" is set to off, and in step S1111 the flag in priority order "3" is set to on.

Next, when the "document name" has not been set and the "paper size" and "paper type" are set in the job history data of the fourth read print log, the process proceeds from steps S1104 and S1105 to step S1107. In step S1107, since the flag of the priority order "2" is off at the current time, it is determined that the condition is not satisfied, and the process proceeds to step S1108. Then, the process proceeds from step S1108 to step S1110. In step S1, since the flag of the priority order "3" is on at the current time, the process returns to step S1103 and the next fifth print log is read out.

The description will return to that of FIG. 11 again. When the processing from steps S1102 to S1111 is executed for all the print logs stored in the log management unit 221, the process from step S1121 and thereafter is performed. The CPU 211 repeats the process from step S1121 and thereafter for all the print logs stored in the log management unit 221.

In step S1122, the CPU 211 reads one print log stored in the log management unit 221. In step S1123, the CPU 211 refers to the table 900 of FIG. 9 and generates the display data of the first-line display item 403 of the job history based on the setting contents of the items corresponding to the priority order in which the flag is turned on. In step S1124, the CPU 211 generates the display data of the second-line display item 404 of the job history based on the setting content of the "start time" in the item 306.

After step S1124, the CPU 211 reads the next print log stored in the log management unit 221 and repeats the process from step S1122. When the process from steps S1122 to S1124 has been performed on all the print logs stored in the log management unit 221, in step S1125 the CPU 211 displays the job history list on the operation panel 205 based on the generated display data. After step S1125, the process of FIG. 11 ends.

As described above, according to the present embodiment, when the user searches for the past log from the job history list, display will be performed based on the content of items common in that the content has been set for all the logs. As a result, uniformity of display items is realized, and the user can easily find a desired log.

Further, in the process of FIG. 11, when the content of the document name has been set for all the print logs, it is determined in step S1104 that the condition is satisfied, and the document name is displayed for all the job histories. That is, if the predetermined item in the first and second embodiments is defined in the data set corresponding to the priority order "1" of the table 900 and if the predetermined item has been set for all the print logs, the items will be displayed in a unified manner. On the other hand, if the predetermined item has not been set for any of the print logs, an item common in that the contents have been set for all the print logs is decided as an alternative display item by the process of FIG. 11, and the items will be uniformly displayed.

In each embodiment, an example of the operation panel 205 on the printing apparatus 100 has been described. However, a configuration may be adopted in which the operation of each embodiment can be controlled from a display unit of an information processing apparatus such as another computer terminal or a mobile terminal via a network. For example, the operation of each embodiment may be applied to the display control on the remote control screen of the information processing apparatus. Even in this case, the same effects as those of the respective embodiments can be obtained.

The invention is not limited to the embodiments described above, and various modifications and variations are possible without departing from the spirit and scope of the invention. Accordingly, the claims are appended hereto in order to make the scope of the invention public.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-217369, filed Dec. 25, 2020, which is hereby incorporated by reference herein in its entirety.

What is claimed is:

1. An image processing apparatus comprising:
   at least one processor with a memory containing instructions, that when executed by the processor, cause the processor to at least:
   after a job has been executed, store history data including a plurality of items as job information, wherein a priority order is set among the plurality of items;
   determine whether content is set in an item having a highest priority among the plurality of items, wherein the determination is done for each history data of a plurality of jobs which have been executed and stored;
   decide, in a case where content is not set in the item having the highest priority, an alternative item in which content is set; and
   control a display unit so as to display a list of execution histories of the plurality of jobs with content set in an item, wherein content set in the alternative item is displayed for a job which is determined not to have content set in the item having the highest priority.

2. The image processing apparatus according to claim 1, wherein the processor is further configured to decide, as the alternative item, an item in which common content is set among history data of the plurality of jobs.

3. The image processing apparatus according to claim 2, wherein the alternative item is a type of job.

4. The image processing apparatus according to claim 1, wherein alternative items to be decided in each history data of the plurality of jobs are different from each other.

5. The image processing apparatus according to claim 4, wherein the alternative items include at least one of a user name, a paper size, and a paper type.

6. The image processing apparatus according to claim 1, wherein the processor is further configured to search for an item in which content is set in each history data of the plurality of jobs, and decides the item found by the search to be the alternative item.

7. The image processing apparatus according to claim 6 wherein the processor is further configured to store the priority order of the plurality of items.

8. The image processing apparatus according to claim 7, wherein the processor is further configured to store
   an item associated with a first priority level and an item associated with a second priority level whose priority level is lower than the first priority level, and
   a content of the item associated with the first priority level is likely to be different between each history data of the plurality of job than a content of the item associated with the second priority level.

9. The image processing apparatus according to claim 1, wherein the plurality of jobs are the same in a type of job.

10. The image processing apparatus according to claim 1, wherein the image processing apparatus further comprises the display unit.

11. The image processing apparatus according to claim 1, wherein the display unit is configured by an apparatus different from the image processing apparatus.

12. The image processing apparatus according to claim 1, wherein a type of the job to be executed is at least one of print, copy, and communication.

13. A display control method to be executed in an image processing apparatus, the method comprising:
   after a job has been executed, storing history data including a plurality of items as job information, wherein a priority order is set among the plurality of items;
   determining whether content is set in an item having a highest priority among the plurality of items, wherein the determination is done for each history data of a plurality of jobs which have been executed and stored;
   deciding, in a case where content is not set in the item having the highest priority, an alternative item in which content is set; and
   controlling a display unit so as to display a list of execution histories of the plurality of jobs with content set in an item, wherein content set in the alternative item is displayed for a job which is determined not to have content set in the item having the highest priority.

14. A non-transitory computer-readable storage medium storing a program for causing a computer to:
   after a job has been executed, store history data including a plurality of items as job information, wherein a priority order is set among the plurality of items;
   determine whether content is set in an item having a highest priority among the plurality of items, wherein the determination is done for each history data of a plurality of jobs which have been executed and stored;
   decide, in a case where content is not set in the item having the highest priority, an alternative item in which content is set; and
   control a display unit so as to display a list of execution histories of the plurality of jobs with content set in an item, wherein content set in the alternative item is displayed for a job which is determined not to have content set in the item having the highest priority.

* * * * *